United States Patent
Snell et al.

[11] Patent Number: 5,823,062
[45] Date of Patent: Oct. 20, 1998

[54] TILT STEERING COLUMN LOCK

[75] Inventors: William M. Snell, Grand Blanc; Ronald Klanke, Royal Oak; Peter Escobedo, Jr., Waterford, all of Mich.

[73] Assignee: Chrysler Corporation, Auburn Hills, Mich.

[21] Appl. No.: 764,806

[22] Filed: Dec. 12, 1996

[51] Int. Cl.⁶ .................................................. B62D 1/18
[52] U.S. Cl. ........................ 74/493; 74/540; 74/577 M; 280/775
[58] Field of Search ...................... 74/493, 540, 577 M; 280/775

[56] References Cited

U.S. PATENT DOCUMENTS

| | | | |
|---|---|---|---|
| 4,594,909 | 6/1986 | Yamaguchi | 74/493 |
| 4,938,093 | 7/1990 | Matsumoto et al. | 74/493 |
| 5,143,402 | 9/1992 | Higashino et al. | 280/775 |
| 5,144,855 | 9/1992 | Yamaguchi et al. | 74/493 |
| 5,328,241 | 7/1994 | Haider | 74/577 M X |
| 5,452,624 | 9/1995 | Thomas et al. | 74/493 |
| 5,566,585 | 10/1996 | Snell et al. | 74/493 |

*Primary Examiner*—Charles A. Marmor
*Assistant Examiner*—Troy Grabow
*Attorney, Agent, or Firm*—Lawrence J. Shurupoff

[57] ABSTRACT

Apparatus for releasably locking the tilt steering column assembly of an automotive vehicle in an adjusted position. A rack on the steering column assembly is engaged by a pawl to lock the steering column assembly in the position selected by the driver. A bracket is provided to hold the pawl engaged with the rack and prevent it from becoming disengaged. The tilt of the steering column can be re-adjusted by moving the bracket so that the pawl can disengage the rack. A wedge is provided for retaining the bracket in its position holding the pawl engaged with the rack. The rack has an arcuate series of teeth engageable with an arcuate series of pawl teeth. The pawl teeth includes a group of intermediate teeth of full size for full engagement with the rack teeth and at each end of the group of intermediate teeth a group of truncated teeth of shorter length than the teeth of the intermediate group to enable engagement and disengagement of the pawl and rack teeth without interference or binding.

7 Claims, 4 Drawing Sheets

TILT STEERING COLUMN LOCK

FIELD OF THE INVENTION

This invention relates generally to tilt steering columns for automotive vehicles, and more particularly to apparatus for releasably locking a tilt steering column in adjusted opposition.

BACKGROUND AND SUMMARY

A tilt steering column allows an operator of a vehicle to adjust the height and angle of the steering wheel depending on the operator's stature, seat position, and comfort. Typically, the steering wheel can also be placed in an uppermost position to allow the operator to get in and out of the driver's seat more easily.

On some steering columns now in use, the locking mechanism is not positive and sometimes releases in response to a frontal impact. When this happens, the tilt mechanism may allow the steering wheel to move to its uppermost position due to the large return spring provided for this purpose. When in its uppermost position, the steering wheel is in an unfavorable position with respect to the driver in the event that the air bag deploys.

The locking mechanism of the present invention is positive in operation and is not subject to release in the event of a frontal impact. More particularly, the locking mechanism comprises a rack and a pawl which, when engaged, lock the steering column in an adjusted position. A bracket is movable to a position holding the pawl engaged with the rack. The bracket is retained in that position by a wedge. Without the wedge, it is possible for the bracket to move away from its bracket-holding position, and thereby release the locking mechanism.

When it is desired to change the angle of the steering column, the bracket may be moved to a release position allowing the pawl to be disengaged. Before moving the bracket to its release position, the wedge is retracted. A hand lever is provided to move the bracket and the wedge.

Further in accordance with the invention, the pawl and rack have interengaging teeth, and some of the pawl teeth are truncated to facilitate engagement and disengagement without interference or binding.

One object of this invention is to provide a locking mechanism for a tilt steering column which is positive in operation and has the foregoing features and capabilities.

Another object is to provide apparatus for locking the tilt steering column in adjusted position which is composed of a relatively few simple parts, is rugged and durable in use, and can be inexpensively manufactured and assembled.

Other objects, features and advantages of the invention will become more apparent from the following description and claims, especially when considered with the accompanying drawings.

DETAILED DESCRIPTION

Figure 1:
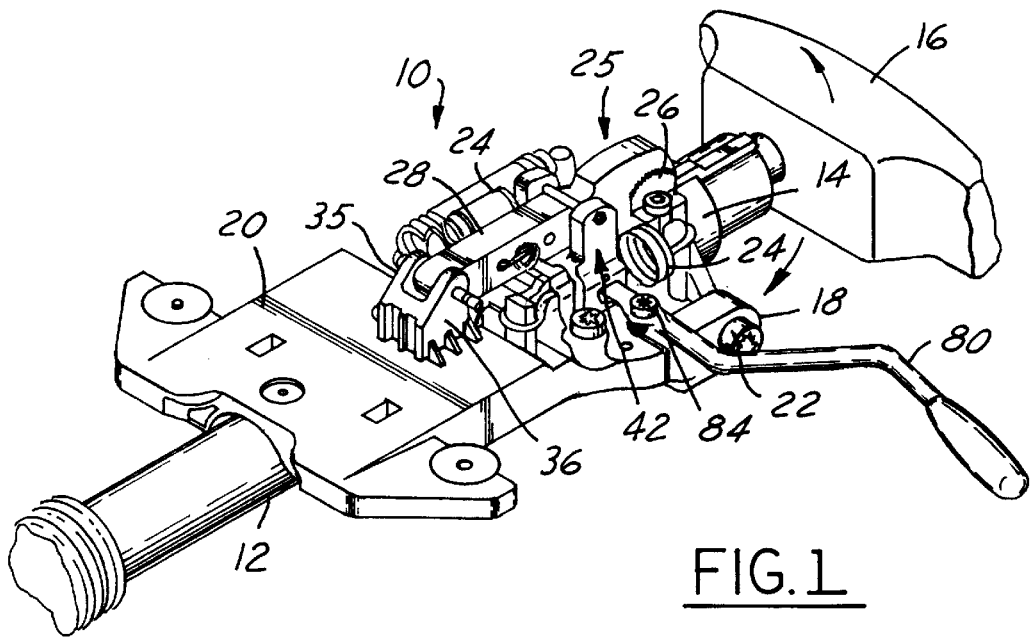
FIG. 1 is a perspective view of apparatus for releasably locking the tilt steering column of an automotive vehicle in adjusted position, constructed in accordance with the invention.
Figure 2A:
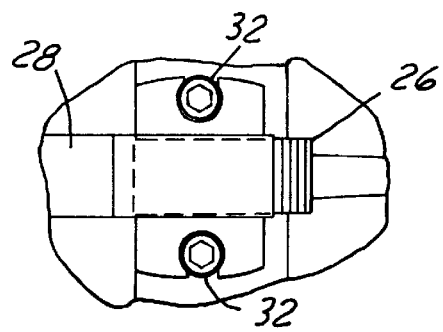
FIG. 2A is an enlarged detail of a portion of the structure shown in FIG. 2.
Figure 2:
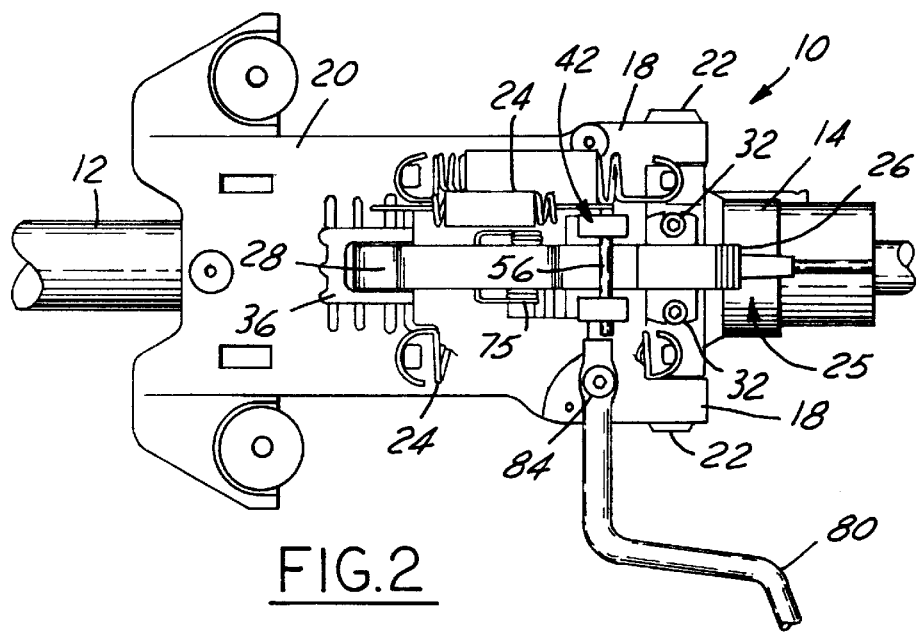
FIG. 2 is a top plan view of the apparatus shown in FIG. 1, with parts broken away.

Referring now more particularly to the drawings, the steering column assembly 10 comprises a steering column 12 mounted in a housing 14, with a steering wheel 16 on the upper end of the steering column. The steering column housing 14 extends between the arms 18 of a support structure 20 and is pivoted to the arms 18 by horizontal pivots 22 for vertical adjustment about a transverse axis perpendicular to the longitudinal center line of the vehicle and of the steering column. The pivotal support for the housing 14 permits the steering column 12 to be adjusted vertically as shown by the arrow in FIG. 1 to a position desired by the driver, but within a range in which the steering column extends at an angle generally upwardly and rearwardly of the motor vehicle. Coil springs 24 are secured at their ends to the support structure 20 and to the housing 14 and urge the housing to swing upwardly to a limiting position making it easier for the driver to get in and out of the vehicle. The support structure 20 is rigidly secured to the vehicle frame.

A locking mechanism 25 comprises a rack 26 and an elongated pawl 28. The locking mechanism is provided to releasably lock the steering column 12 in an adjusted position. The rack 26 is secured to the upper surface of the housing 14 by fasteners 32. The rack 26 has a series of spaced-apart rack teeth 34 on its upper surface extending perpendicular to the axis of pivotal adjustment of the steering column housing 14. The pawl 28 also extends perpendicular to the axis of pivotal adjustment of the steering column housing. The front end of the pawl is pivoted at 35 for vertical pivotal movement on a cleat 36 rigidly mounted on the upper surface of the support structure 20. The rear end of the pawl 28 has a series of spaced-apart teeth 38 on its lower surface which extend perpendicular to the axis of pivotal adjustment of the steering column housing 14 and are opposed and complementary to the rack teeth 34. When the pawl teeth engage the rack teeth, the steering column housing 14 is locked in an adjusted position.

Figure 9:
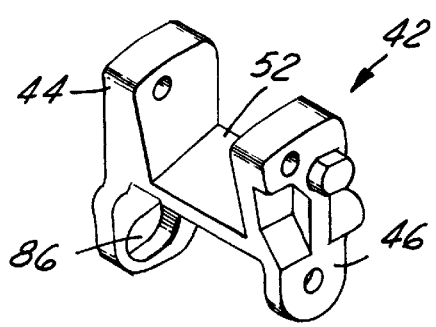
FIG. 9 is a perspective view of the bracket for holding the pawl in the locked position, but with the bracket pin removed.
Figure 10:
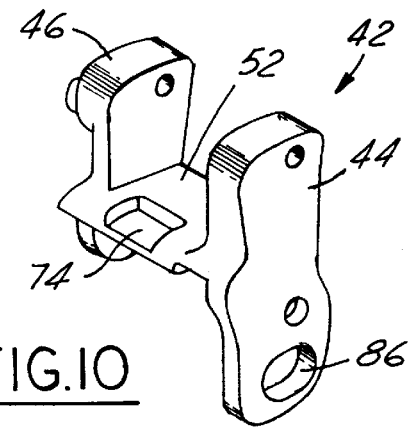
FIG. 10 is a perspective view of the bracket as seen from a different angle.

The pawl 28 can be held down in an operative position in which the pawl teeth 38 engage the rack teeth 34 by a cam bracket 42 (FIGS. 9 and 10). The bracket has laterally spaced legs 44 and 46 which straddle the pawl 28 and also straddle an upstanding mounting portion 48 on the support structure 20. The legs are pivotally connected to the mounting portion 48 by a horizontal pivot pin 50 which extends perpendicular to the pawl 28. The legs 44 and 46 are connected to one another about midway of their length by an integral web 52 which is disposed above the mounting portion 48 and beneath the pawl. A horizontal lock or cam pin 56 connects the upper ends of the legs 44 and 46 above the pawl.

The top of the pawl has a cam surface 60 which has a locking surface portion 62 and a release surface portion 64. The locking surface portion 62 is generally flat and extends lengthwise of the pawl. The release surface portion 64 is located rearwardly of the locking surface portion 62 and extends in continuation of the locking surface portion and constitutes a dip or relief or depressed area relative to the locking surface portion 62. The bracket 42 is capable of being pivoted between positions in which the cam pin 56 engages the locking surface portion 62 (FIGS. 3 and 4) or the release surface portion 64 (FIG. 6).

Figure 3:
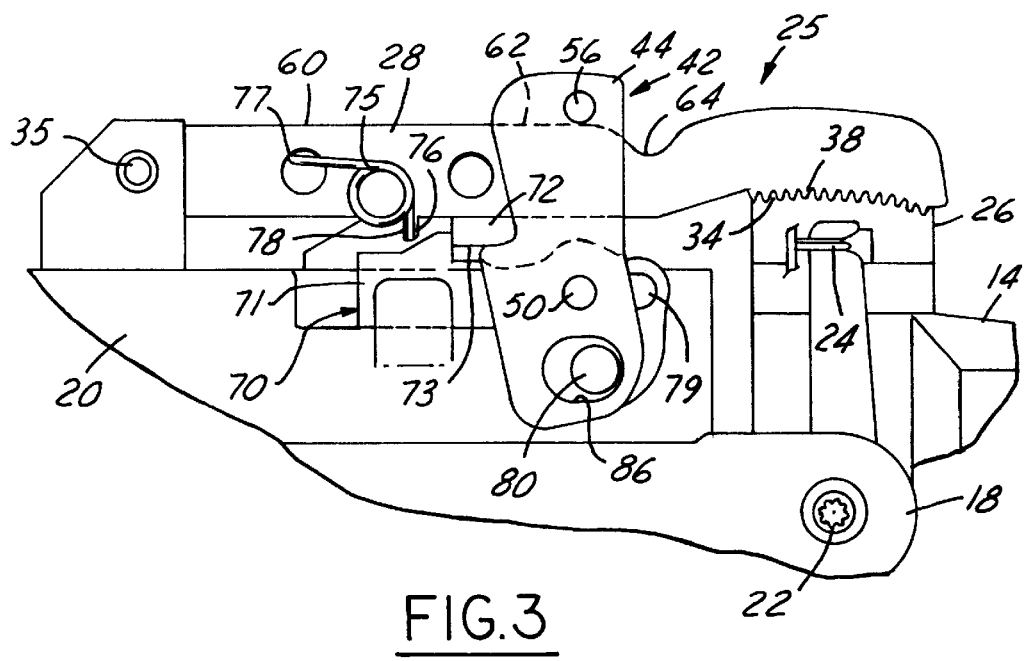
FIG. 3 is an enlarged fragmentary side elevational view of the apparatus of FIGS. 1 and 2.
Figure 7:
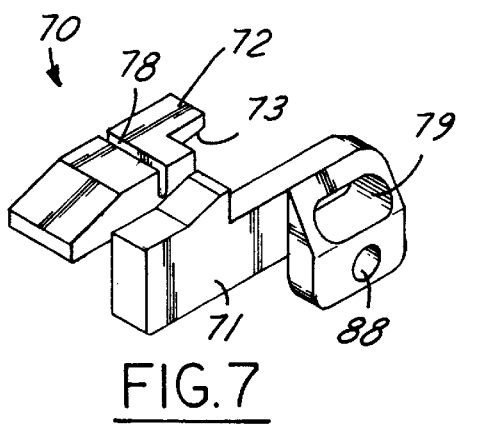
FIG. 7 is a perspective view of the wedge for holding the bracket in the locked position to prevent accidental release of the locking mechanism.
Figure 8:
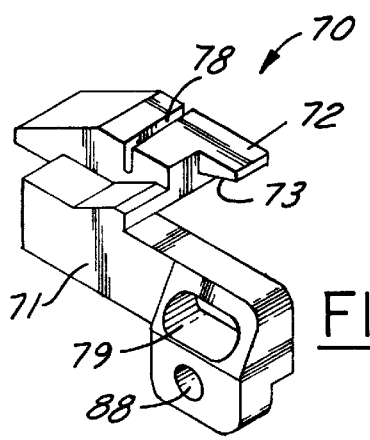
FIG. 8 is a perspective view of the wedge as seen from a different angle.
Figure 4:
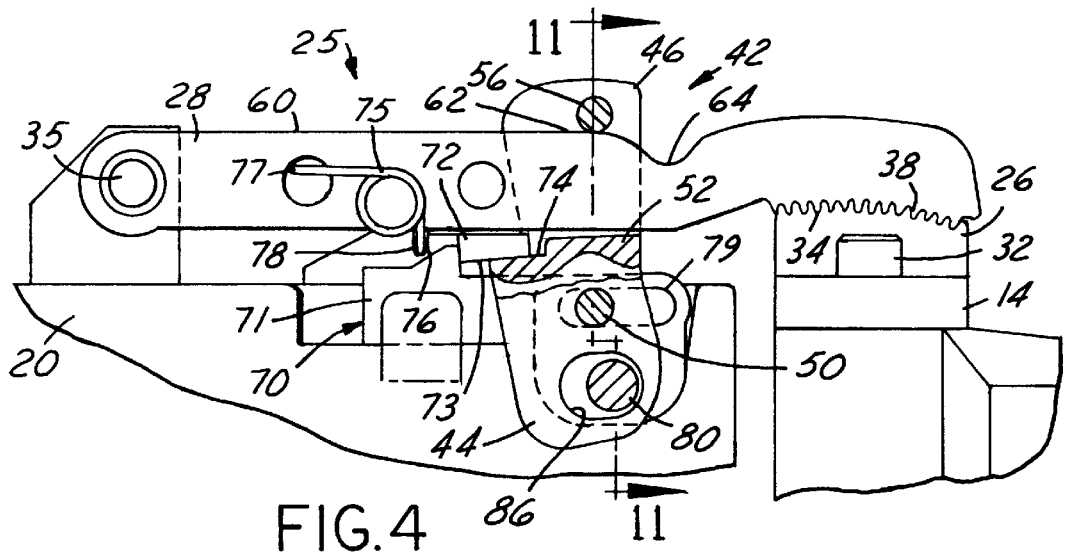
FIG. 4 is a view similar to FIG. 3 but with parts broken away and in section.

The bracket 42 is normally held in the position of FIGS. 3 and 4 by a wedge 70 (FIGS. 7 and 8). The wedge 70 comprises a wedge block 71 which is mounted for longitudinal sliding movement on the support structure 20. The wedge block 71 has an integral extension or wedge finger 72 which has a flat bottom surface 73 adapted to have a fall surface-to-surface engagement with a complementary flat wedging surface 74 in a recess on the top of the web 52 of the bracket 42. The wedge block 71 when in its retracted position of FIG. 6 out of contact with the wedging surface 74 is retained in such position by a double torsion spring 75. The spring 75 is mounted on pawl 28 and has a transverse bar 76 extending into a notch 78 in the top of the wedge block 71. A horizontally elongated slot 79 in a lower extension of the wedge block 71 clears the pivot pin 50. The spring 75 also has a transverse bar ends 77 extending through a hole in the pawl which urges the pawl upwardly.

Figure 5:
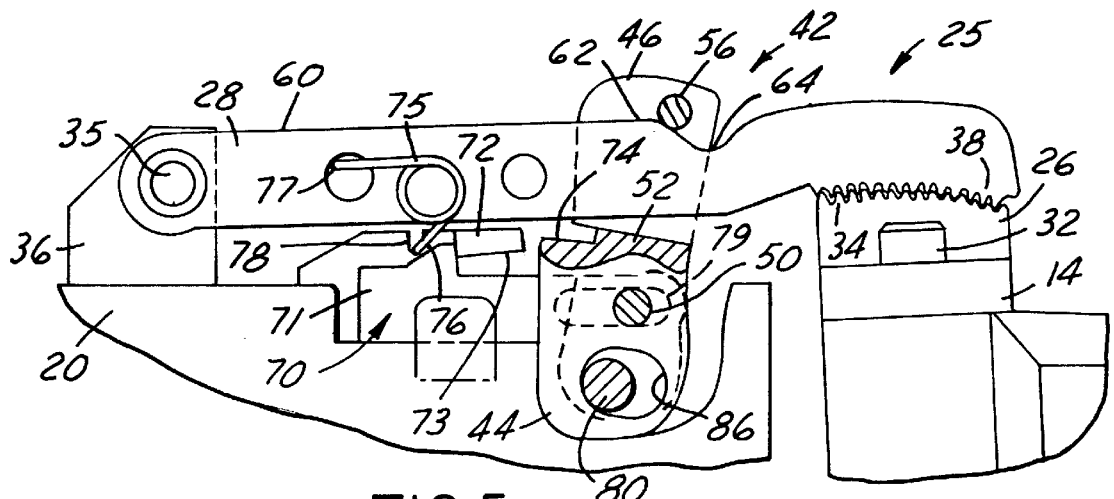
FIGS. 5 and 6 are views similar to FIG. 4, but show the parts in different positions.
Figure 6:
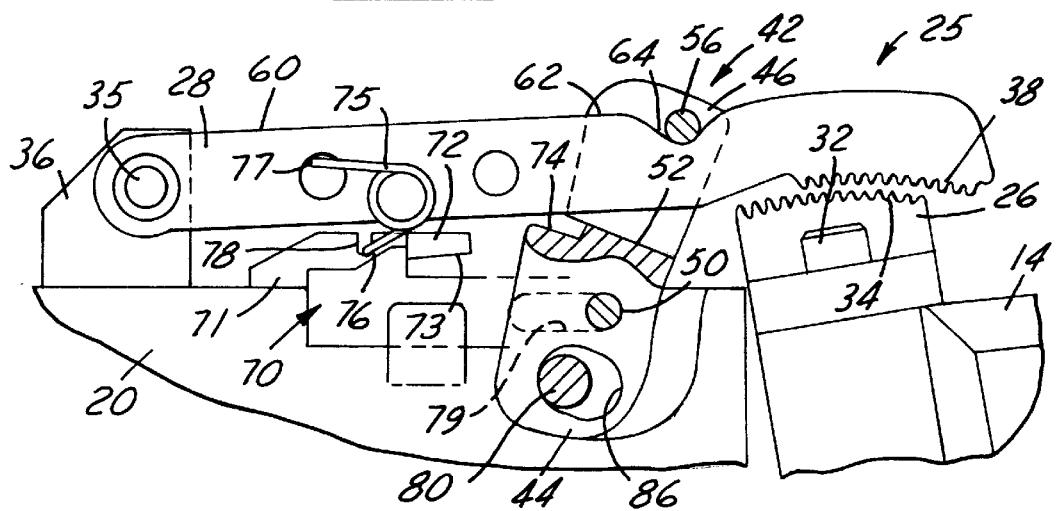
Figure 11:
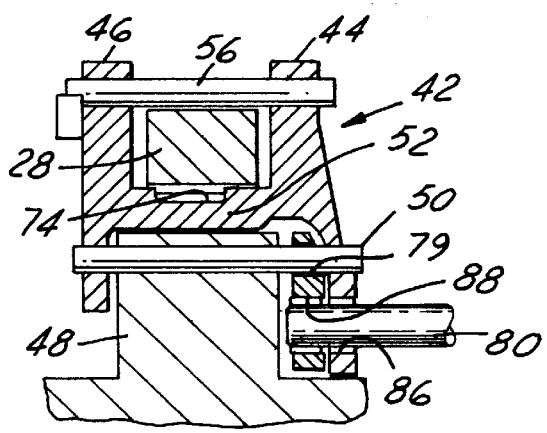
FIG. 11 is a sectional view taken on the line 11—11 in FIG. 4.
Figure 12:
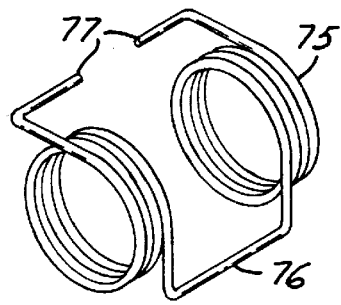
FIG. 12 is a perspective view of a double torsion spring for urging the wedge to its retracted position and the pawl to its released position.

When the wedge block 71 is retracted, the bracket 42 can be pivoted clockwise from the position of FIGS. 3 and 4 to the intermediate position of FIG. 5 and then to the FIG. 6 position by a hand lever 80. Hand lever 80 is pivoted intermediate its ends on the support structure 20 about a vertical pivot pin 84. The inner end of the hand lever 80 extends through a horizontally elongated slot 86 in the lower end of leg 44 of the bracket 42 beneath the pivot pin 50 and into a hole 88 in the wedge block 71. Normally, the hand lever is urged by a spring, the spring 75 with or without an additional spring (not shown) clockwise in FIG. 1 to the position there shown holding the bracket 42 and the wedge block 71 in the position of FIGS. 3 and 4. In this position of the hand lever 80, its inner end portion engages the right or rear of slot 86 in the bracket 42 and the bracket holds the pawl down. Also, in this position of the hand lever, surface 73 of wedge finger 72 of the wedge block is in full surface-to-surface contact with the surface 74 in the web 52 of bracket 42 to prevent the bracket from moving away from that position even in the event of a severe frontal impact.

When it is desired to change the tilt of the steering column, the hand lever 80 is pivoted counterclockwise in FIG. 1 which initially retracts the wedge block 71 to a position in which the wedge finger 72 is substantially fully withdrawn from engagement with the wedging surface 74 of the bracket 42 and the inner end portion of the hand lever approaches the left or forward portion of the slot 86 in the leg 44 of the bracket. Continued clockwise movement of the hand lever causes the inner end portion thereof to engage the forward end of the slot 86 to begin pivoting the bracket (FIG. 5) and still further clockwise movement of the hand lever will result in further clockwise pivoting of the bracket 42 to the FIG. 6 position in which the cross pin 56 at the top of the bracket overlies the recessed or release surface portion 64 of the pawl allowing the pawl to rise and turn counterclockwise in FIG. 6 under the influence of the spring 75 to disengage the pawl and rack. The steering column can then be tilted to a different position. Returning the hand lever counterclockwise to its initial position will re-lock the rack and pawl and re-establish full surface wedging engagement of the wedge finger 72 with the wedging surface 74 of the bracket 42 so that the bracket cannot accidentally be withdrawn from that position.

Figure 13:
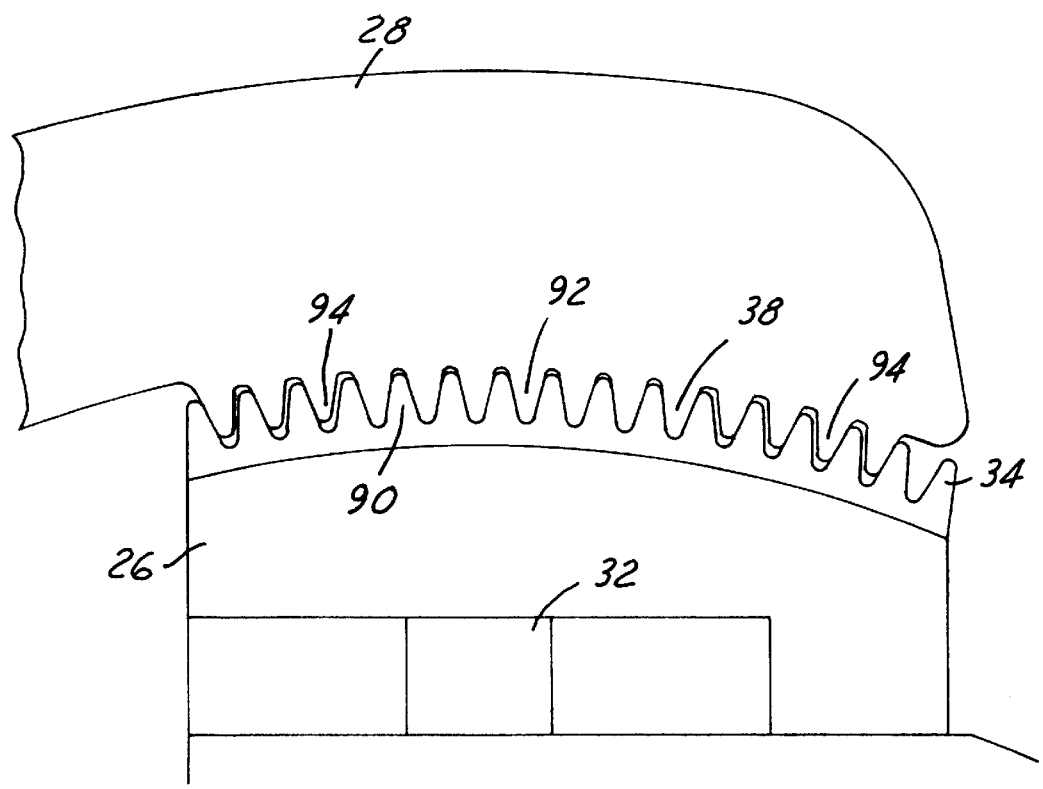
FIG. 13 is an enlarged fragmentary view showing the pawl teeth engaged with the ratchet teeth.

FIG. 13 is an enlargement showing the engagement of the pawl teeth 38 and rack teeth 34. As there shown, the rack teeth 34 are arranged in an arcuate series of teeth 90 of identical size, shape and spacing. The pawl teeth 38 have a group of intermediate teeth 92 of the same full size, shape and spacing as the rack teeth for engagement with the rack teeth. At each end of the group of intermediate teeth 92 is a group of teeth 94. Teeth 94 are truncated, that is, they are shorter than the teeth of the intermediate group. This truncating of the teeth 94 enables engagement and disengagement of the pawl and rack teeth without interference or binding.

We claim:

1. Apparatus for releasably locking the tilt steering column of an automotive vehicle in an adjusted position, comprising support structure adapted to be affixed to the vehicle frame, a steering column assembly, means for pivotally mounting said steering column assembly on said support structure for vertical pivotal movement, a rack carried by said steering column assembly and having rack teeth, a pawl having first and second ends, pawl teeth at said first end of said pawl, means for pivoting said second end of said pawl to said support structure for pivotal movement of said pawl to positions engaging and disengaging said rack and pawl teeth, a cam bracket, means for pivotally mounting said cam bracket to said support structure for movement between first and second positions, said pawl having a cam surface provided with locking and release surface portions, said cam bracket having a lock pin slidable over said cam surface and engageable with said locking surface portion thereof in its first position and with said release surface portion thereof in its second position, said pawl, when said cam bracket is in its first position, being moved by said lock pin to its position engaging said rack and pawl teeth to lock said steering column assembly in adjusted position and when said cam bracket is in its second position, being released by said lock pin to enable movement of said pawl to its position disengaging said rack and pawl teeth and releasing said steering column assembly, a wedge mounted on said support structure for sliding movement from a retracted position to an advanced position positively retaining said bracket in said first position thereof, manually operable means for moving said wedge to its retracted position to release said bracket and thereafter in sequence for moving said bracket from the said first to the said second position thereof, said manually operable means also operable to move said bracket from said second position to said first position thereof and thereafter in sequence to move said wedge to its advanced position, and actuating means operative when said bracket is moved to its second position for moving said pawl to its position disengaging said rack and pawl teeth.

2. Apparatus as defined in claim 1, wherein said wedge has a flat bracket-retaining wedge finger and said bracket has a flat surface engaged by said bracket-retaining surface of said wedge finger in the advanced position of said wedge.

3. Apparatus as defined in claim 1, wherein said means for moving said pawl to its position disengaging said rack and pawl teeth includes a spring which also yieldably urges said wedge to its retracted position.

4. Apparatus as defined in claim 1, wherein said bracket is pivotally mounted on said support structure and has a pair of legs straddling said pawl, and said pin extends across the outer side of said pawl and has its ends secured to said legs.

5. Apparatus as defined in claim 4, wherein said wedge has a wedge finger provided with a flat bracket-retaining surface and said bracket has a flat surface adapted for full surface-to-surface engagement by said bracket-retaining surface of said wedge finger in the advanced position of said wedge.

6. Apparatus as defined in claim 5, wherein said means for moving said pawl to its position disengaging said rack and pawl teeth includes a spring which also yieldably urges said wedge to its retracted position.

7. Apparatus as defined in claim 6, wherein said pawl teeth and said rack teeth are each arranged in an arcuate series, said rack teeth being of identical size, shape and spacing, said pawl teeth including a group of intermediate teeth of the same full size, shape and spacing as said rack teeth for full engagement with said rack teeth and at each end of said group of intermediate teeth a group of truncated teeth of shorter length than the teeth of the intermediate group to enable engagement and disengagement of said pawl and rack teeth without interference or binding.

* * * * *